Jan. 20, 1970  E. A. CORL  3,490,873
METHOD AND COMPOSITION FOR INSPECTING SEMICONDUCTOR DEVICES
Filed Aug. 10, 1965  2 Sheets-Sheet 1
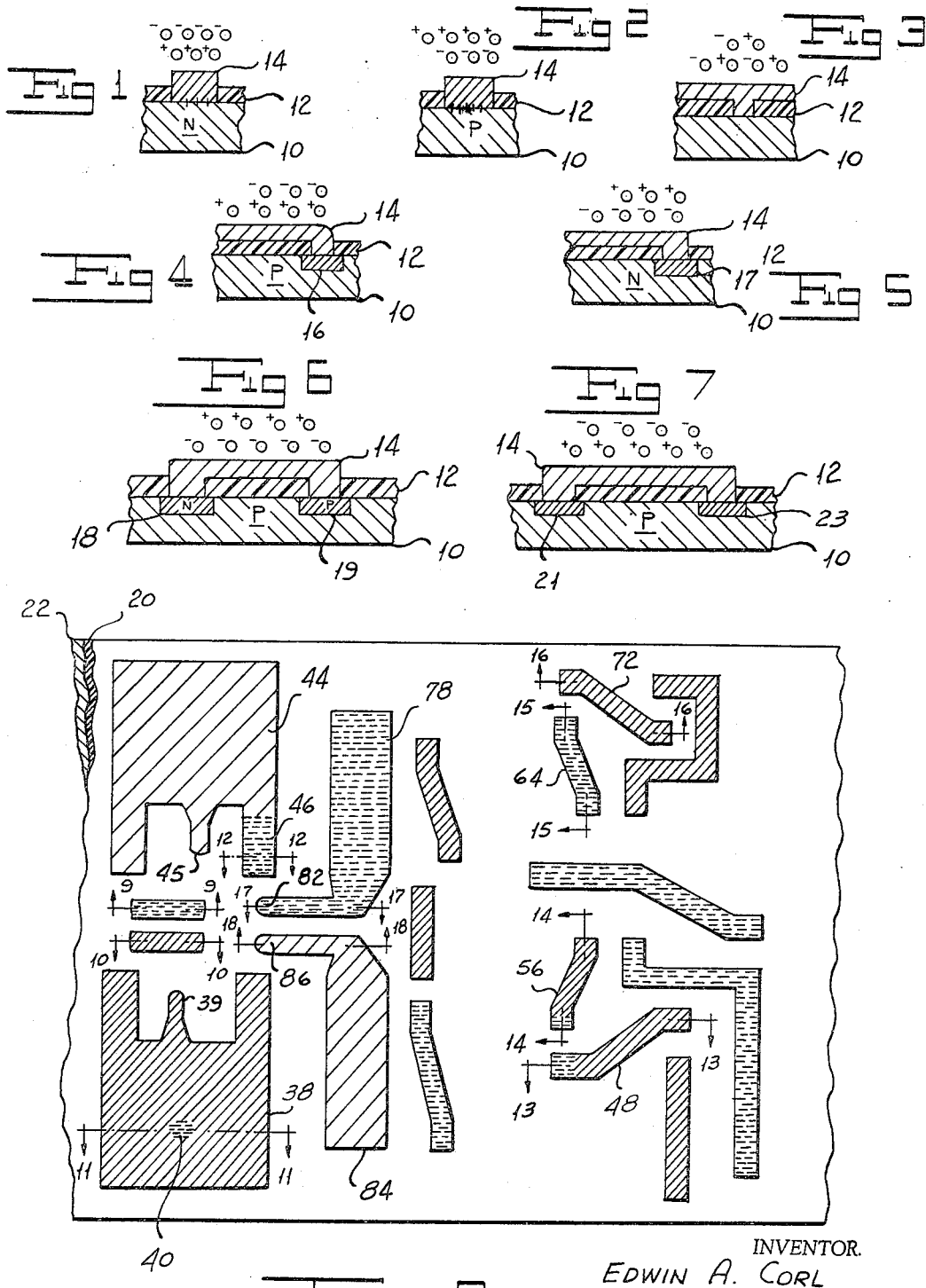
INVENTOR.
EDWIN A. CORL
BY
Shenier + O'Connor
ATTORNEYS

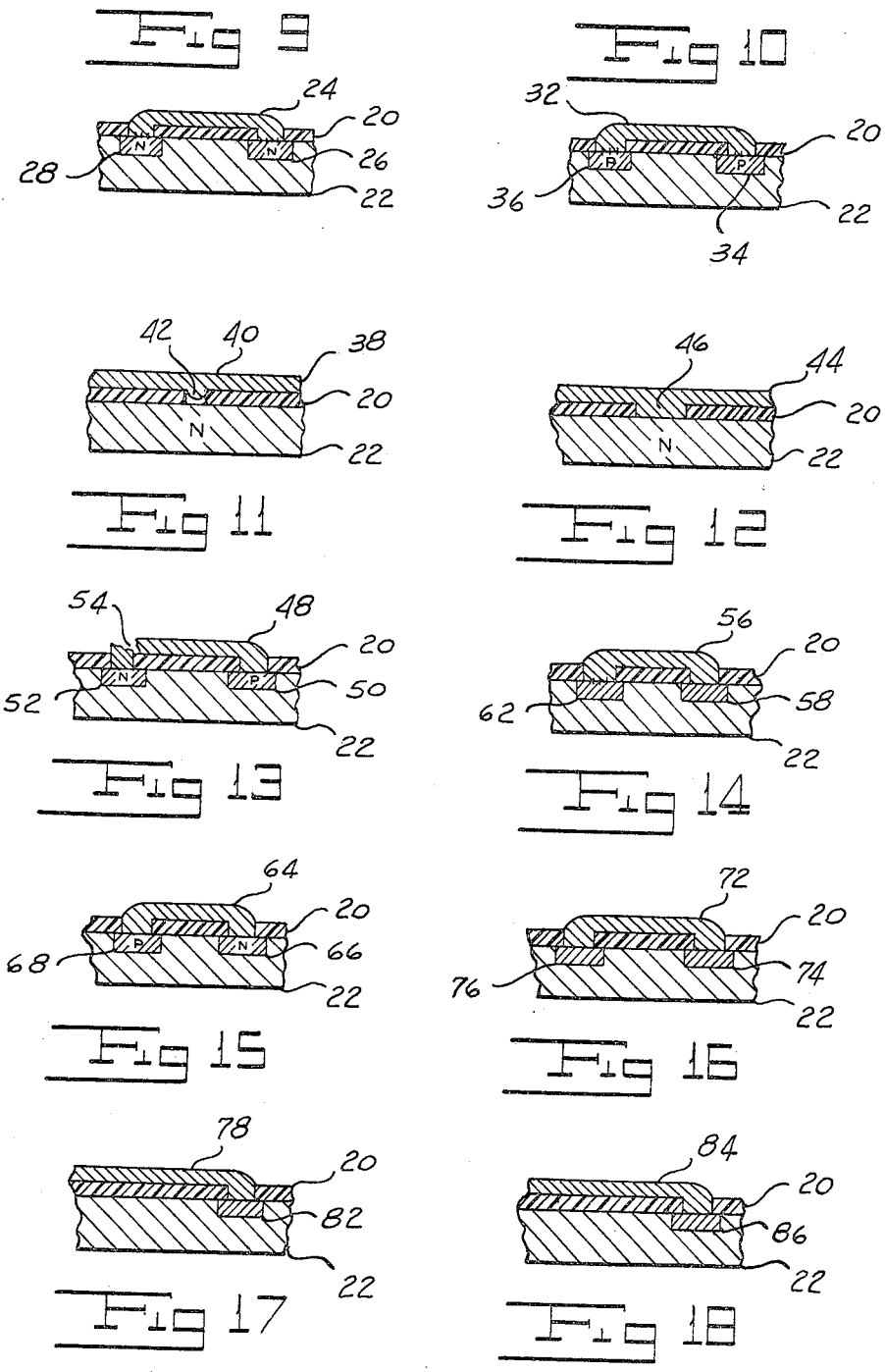

United States Patent Office 3,490,873
Patented Jan. 20, 1970

3,490,873
METHOD AND COMPOSITION FOR INSPECTING SEMICONDUCTOR DEVICES
Edwin A. Corl, Wappingers Falls, N.Y., assignor to United Aircraft Corporation, East Hartford, Conn., a corporation of Delaware
Filed Aug. 10, 1965, Ser. No. 478,674
Int. Cl. G01n 31/22, 31/00
U.S. Cl. 23—230
19 Claims

ABSTRACT OF THE DISCLOSURE

A method of detecting flaws in integrated circuits by treating the circuit with ionized fluid including an ion which distinctively colors metal regions of the circuit to permit detection and identification of flaws by visual inspection for abnormalities in the post-treatment color of the treated conductive material.

---

My invention relates to a method and composition of matter for inspecting semiconductor devices and more particularly to a novel method for treating integrated circuits to facilitate the detection of latent flaws therein, and to a novel composition of matter used in connection therewith.

It will be appreciated that effective inspection of integrated circuits and the ability to determine the cause of a malfunctioning circuit are indispensable to the production of reliable products.

It is well understool in the prior art that inspection of integrated circuits before they are diced and mounted can materially increase the yield of acceptable, completely-assembled circuits and thus markedly lower the cost of production. However, the visual, in-line inspection of integrated circuits as practiced in the prior art does not satisfactorily or effectively detect flaws owing to the small size of the circuits, their complexity, and the fact that many of the flaws are not optically discernible.

In addition to the visual inspection of the prior art, integrated circuits are also energized and operationally inspected and tested by means of suitably connected monitoring apparatus such as meters, oscilloscopes or the like. It is usually not practical, however, to energize the circuit and to perform such tests prior to dicing and assembling the individual circuits.

The cause of a malfunctoning integrated circuit may also be determined by means of an operational test. In order to operationally test a malfunctioning circuit, its components usually must be isolated and individually tested. This requires severing the deposited interconnections. Such procedures are time consuming and costly. Furthermore damage to the circuit being tested sometimes occurs to such extent that it becomes impossible to establish with certainty the original cause of the malfunction.

These prior art methods for detecting and identifying flaws in integral circuits are merely extensions of methods which have been used for testing conventional circuits. They have not proven satisfactory for testing integrated circuits owing to the inherent differences between the two types of circuits.

I have invented a method for testing integrated circuits which makes latent flaws patent. With my new method the cause of a circuit malfunction can be determined without energizing the circuit or isolating its components. My new process does not deleteriously affect inspected circuits. My process permits integrated circuits to be inspected before dicing and mounting. Then too, my method is particularly useful for detecting such flaws as microscopic cracks in the interconnections, poor contacts to the semiconductor substrate, pinholes in the insulating coating underlying metallic conductors, and other similar flaws which are either not readily apparent or are invisible.

One object of my invention is to provide a novel method of treating semiconductor devices which facilitates their inspection.

Another object of my invention is to provide a novel method of treating integrated circuits which enables the ready detection of latent flaws.

A further object of my invention is to provide a passive method for detecting latent flaws in an integrated circuit without energizing the circuit.

Still another object of my invention is to provide a method for analyzing a malfunctioning integrated circuit without isolating the circuit components.

An additional object of my invention is to provide a method for detecting latent flaws in integrated circuits which does not deleteriously affect the circuits.

An additional object of my invention is to provide a new method for treating integrated circuits which facilitates their effective and inexpensive inspection.

A further object of my invention is to provide a novel composition of matter for use in my process.

Other and further objects of my invention will appear from the following description.

In general my invention contemplates the provision of a method for detecting integrated circuit flaws by treating the circuit with ionized fluid that includes an ion which colors the metallic regions of the circuit which it contacts. After treatment I detect and identify flaws in the circuit by inspecting the circuit for abnormalities in the post-treatment color of the conductors owing to the fact that flaws of various types alter the normal ionic attraction of the conductor in the region of the flaw.

In the accompanying drawings which form part of the instant specification and which are to be read in conjunction therewith and in which like reference numerals are used to indicate like parts in the various views:

FIGURE 1 is a fragmentary sectional view of an integrated circuit illustrating the action of my process on a metallic conductor associated with an n-type substrate;

FIGURE 2 is a fragmentary sectional view of an integrated circuit illustrating the action of my process on a metallic conductor associated with a p-type substrate;

FIGURE 3 is a fragmentary sectional view of an integrated circuit illustrating the action of my process on a metallic conductor in contact with an intrinsic semi-conducting substrate;

FIGURE 4 is a fragmentary sectional view of an integrated circuit illustrating the action of my process on a metallic conductor in contact with an n-type region and overlying a p-type substrate;

FIGURE 5 is a fragmentary sectional view of an integrated circuit illustrating the action of my process on a metallic conductor in contact with a p-type region and overlying an n-type substrate;

FIGURE 6 is a fragmentary sectional view of an integrated circuit illustrating the action of my process on a metallic conductor interconnecting a low resistivity p-type region and a high resistivity n-type region;

FIGURE 7 is a fragmentary sectional view of an integrated circuit illustrating the action of my process on a metallic conductor interconnecting a low resistivity n-type region and a high resistivity p-type region;

FIGURE 8 is a fragmentary plan view of an integrated circuit wafer which has been treated in accordance with one mode of practicing my new process, hatched to indicate various characteristic colors;

3

FIGURE 9 is a sectional view taken along the line 9—9 of FIGURE 8 illustrating a satisfactory connection between two regions of n-type material;

FIGURE 10 is a sectional view taken along the line 10—10 of FIGURE 8 illustrating a satisfactory connection between two regions of p-type material;

FIGURE 11 is a sectional view taken along the line 11—11 of FIGURE 8 illustrating a pinhole in the insulating layer underlying a capacitor plate connected to a p-type region;

FIGURE 12 is a sectional view taken along the line 12—12 of FIGURE 8 illustrating a capacitor plate which is short circuited to the underlying substrate;

FIGURE 13 is a sectional view taken along the line 13—13 of FIGURE 8 illustrating a micro-crack in a conductor connecting a p-type and an n-type region;

FIGURE 14 is a sectional view taken along the line 14—14 of FIGURE 8 illustrating an unsatisfactorily alloyed connection to a p-type region;

FIGURE 15 is a sectional view taken along the line 15—15 of FIGURE 8 illustrating a satisfactory connection between a low resistivity n-type region and a high resistivity p-type region;

FIGURE 16 is a sectional view taken along the line 16—16 of FIGURE 8 illustrating a satisfactory connection between a high resistivity n-type region and a low resistivity p-type region;

FIGURE 17 is a sectional view taken along the line 17—17 of FIGURE 8 illustrating a satisfactorily formed capacitor plate connected to an n-type region;

FIGURE 18 is a sectional view taken along the line 18—18 of FIGURE 8 illustrating a capacitor plate that is unsatisfactorily alloyed to an n-type region of the substrate.

More particularly, referring now to FIGURES 1 through 7 of the drawings, in each of the structures illustrated therein, a metallic conductor 14 makes ohmic contact with a semiconducting substrate 10, the surface of which is covered with a layer 12 of suitable insulating material known in the art, such as silicon dioxide. In a typical integrated circuit the substrate 10 is silicon and conductor 14 is aluminum. It will be understood that my invention is not limited to detecting flaws in integrated circuits comprising silicon and aluminum. It may be advantageously used, as will be appreciated by those skilled in the art, to detect flaws in other integrated circuits known in the art, such as a circuit comprising germanium as the substrate and copper or silver for interconnections or similar semiconductor circuits.

Metals immersed in certain ionic solutions react with the positive or negative ions thereof. In some solutions both the positive and negative ions will react. In such reactions a distinctive visible surface characteristic will be produced depending on the solution and the reactant. Metallic conductors of an integrated circuit which are associated with n-type semiconducting regions attract positive ions (cations) and repel negative ions (anions) while conductors which are associated with p-type regions attract negative ions and repel positive ions.

In accordance with my invention, I treat the integrated circuit prior to inspection with an ionized fluid which has positive ions or negative ions, or both, which react with the metallic regions of the circuit which they contact to form a visibly distinct coating thereon. In the drawings, positive ions are indicated schematically as +O and negative ions as −O. An aqueous solution which includes dissolved sodium dichromate is typical of a solution that I use in the practice of my invention. The dichromate ions are negative and react with aluminum to form a brown amorphous coating thereon. As will be appreciated by those skilled in the art, sodium ions do not react to any discernible extent with aluminum.

A conductor 14 connected to a substrate 10 of n-type semiconducting material, as shown in FIGURE 1, attracts positive ions +O and repels negative ions −O as is schematically indicated by the proximity of the symbol +O to the surface of the conductor and the remoteness of the symbol −O therefrom. As indicated schematically in FIGURE 2, a conductor 14 connected to a p-type substrate 10 attracts negative ions −O and repels positive ions +O. Prior to treatment, the conductors 14 of FIGURES 1 and 2 were identical in appearance. After my treatment the conductor 14 of FIGURE 1 is readily distinguishable from conductor 14 of FIGURE 2. A treating solution including sodium dichromate, for example, would not change the appearance of the conductor 14 of FIGURE 1 but would color conductor 14 of FIGURE 2 brown.

Referring to FIGURE 3, a conductor 14 connected to an intrinsic semiconducting substrate 10 as shown, or one which is electrically isolated from the substrate (not shown) is substantially neutral in that it neither attracts nor repels ions. It should be noted that if the conductor is neutral, both positive and negative ions contact the surface of the conductor 14. The coating which forms is readily distinguishable from that which forms in either the situation illustrated in FIGURE 1 or the situation illustrated in FIGURE 2. If both the positive and the negative ions of the chosen treating solution react with aluminum, the hue of the coating is substantially a chromatic combination of the hues of the coating which each ion forms individually. If only one of the ions of the chosen solution reacts with aluminum, the color is less intense in comparison with the color of the conductor of FIGURES 1 or 2, owing to the fact that the density of the reaction product which forms as a result of my treatment is a function of the strength of attraction of the ions to the conductor for a given solution. A solution of sodium dichromate would color conductor 14 of FIGURE 3 beige, for example.

Referring to FIGURE 4, a conductor 14 connected to an n-type region 16 and overlying a p-type substrate 10 attracts positive ions +O. In the configuration illustrated in FIGURE 4 the p-type substrate 10 influences the attraction of ions to conductor 14 and may in certain instances discernibly alter the coloration of the conductor 14 compared with that which would be produced by the n-type region 16 alone. The ionic attractive force to the conductor 14 is a function, first, of the conductivity type and the resistivity of the semiconductor material to which it is attached. Secondly, to a lesser extent, the attractive force is a function of the conductivity type and of the resistivity of the semiconductor material over which it passes. Moreover, as the thickness of the underlying insulating layer 12 increases, its influence on the attraction of ions to conductor 14 decreases. The influence of the substrate, if discernible, is usually discernible as a change in the intensity of the color of the conductor.

In FIGURE 5 the substrate 10 is n-type semiconducting material and region 17 is p-type material. The conductor 14 attracts negative ions −O, and the color of the conductor 14 is approximately the same as the color of conductor 14 in FIGURE 2. In a treating solution of sodium dichromate for example, in which the negative ions of the solution react with conductor 14, the effect of n-type substrate 10, if discernible, is to diminish the intensity of the color of the coating formed as compared with the situation illustrated in FIGURE 2.

Generally, positive ions are attracted to a conductor which interconnects regions of different conductivity type uniformly over its entire surface if the n-type region is more heavily doped. If the p-type region is more heavily doped, negative ions are attracted to the conductor uniformly over its entire surface. In FIGURE 6 region 18 is high resistivity (lightly doped) n-type semiconducting material, whereas region 19 is relatively low resistivity (heavily doped) p-type semiconducting material. Conductor 14 attracts negative ions −O and repels positive ions +O. Its color after treatment is similar to that of conductor 14 of FIGURE 1 although usually somewhat less intense owing to its connection to the n-type region.

In FIGURE 7 an n-type region 21 has a lower resistivity than a p-type region 23. Conductor 14 in this case attracts positive ions +O and repels negative ions −O. Its color is similar to the color of conductor 14 of FIGURE 2 although somewhat less intense.

The p-type substrate of FIGURE 6 tends to reinforce the ionic attraction of the predominant p-type region 19. The p-type substrate of FIGURE 7 tends to lessen the ionic attraction of the predominant n-type region 21. Thus, the substrate in the instances illustrated in FIGURES 6 and 7 may produce a variation in the intensity of the color of conductors 14 in comparison with the conductors 14 of FIGURES 1 and 2 respectively.

It should be noted that if the resistivity of regions 18 and 19 or 21 and 23 is substantially the same, conductor 14 neither attracts nor repels ions and its color would be similar to that of conductor 14 in FIGURE 3.

In the practice of my invention I have successfully used each of the following three specific solutions for treating silicon integrated circuits which employ aluminum interconnections, in which the percentages indicate amounts by weight:

I

| | Percent |
|---|---|
| Chromic acid ($H_2CrO_3$) | 1.00 |
| Ammonium fluoride ($NH_4F$) | 0.50 |
| Water | 98.50 |

II

| | |
|---|---|
| Chromic acid ($H_2CrO_3$) | 0.75 |
| Sodium dichromate ($Na_2Cr_2O_7$) | 0.25 |
| Ammonium fluoride ($NH_4F$) | 0.30 |
| Water | 98.70 |

III

| | |
|---|---|
| Chromic acid ($H_2CrO_3$) | 0.80 |
| Potassium dichromate ($K_2Cr_2O_7$) | 0.25 |
| Ammonium fluoride ($NH_4F$) | 0.20 |
| Water | 98.75 |

I find that it is advantageous to add to each of the above solutions a small amount (2 or 3 drops per gallon) of a suitable, acid-stable, water-soluble wetting agent such as "Triton X" a registered trademark of Rohm and Haas Company for wetting agents of alkylaryl polyether alcohols, sulfonates and sulfates of the non-ionic type.

The respective processes for treating an integrated circuit with the above solutions is the same for each solution. I immerse the circuit in the solution at room temperature for a period of from one to three minutes. I then remove the circuit from the solution; rinse it thoroughly in distilled, de-ionized water; and dry it by placing it in a stream of suitable inert gas such as nitrogen, the temperature of which is preferably below 130° F. Advantageously, I treat a wafer by immersing it in the solution after doping the wafer and depositing the interconnections but prior to dicing it.

As will be appreciated by those skilled in the art, aluminum interconnections deposited on the surface of an integrated circuit have a metallic luster which gives them a silvery appearance prior to my treatment. After treatment with one of the above solutions (Example I or II or III) some of the interconnections retain their silvery appearance and others are coated with an amorphous precipitate colored various shades of brown. FIGURE 8 shows the appearance of a silicon integrated circuit with aluminum interconnections which has been treated with one of the above solutions. Negative ions (anions) present in each of the above examples react with aluminum to form a brown coating thereon. Positive ions (cations) of each of these solutions do not perceptibly react with the aluminum interconnections.

In FIGURE 8 brown regions are shaded with 45° lines of various density to indicate various intensities of color; silvery regions are shaded with dashes. FIGURES 9 through 18 illustrate the conditions resulting in the coloration shown in FIGURE 8.

Referring to FIGURES 8 and 9, the silvery appearance of a connection 24 which interconnects two n-type regions 26 and 28 indicates a satisfactory component. Conductor 24 retains its silvery appearance because the negative ions of the treating solution were repelled from its surface. The positive ions of the solutions of Example I or II or III, which were attracted to this conductor, do not react therewith.

Referring to FIGURES 8 and 10, after my treatment the conductor 32 which interconnects two p-type regions 34 and 36 has a dark brown color resulting from the attraction of negative ions to the conductor 32 and the resultant formation of a fairly dense coating thereon. It will be appreciated from the foregoing explanation that in this instance the dark brown coating indicates a satisfactory interconnection. It should be noted that the coating which forms does not affect the operation of the circuit.

Referring to FIGURES 8 and 11, conductor 38, predominantly brown after treatment, is connected to a p-type region at 39 and overlies an n-type region. Conductor 38, which forms the upper plate of a capacitor, would have a substantially uniform brown appearance if flawless owing to its connection to a p-type region. The small silvery region or spot 40 which is readily apparent on the surface of conductor 38 indicates the presence of a pinhole 42 in the insulating layer 20, as can be seen in FIGURE 10. The n-type substrate has a dominant influence in this region, repulsing negative ions therefrom. The effect of the pinhole is only local since the conductor material does not directly contact the substrate through the pinhole.

Referring to FIGURES 8 and 12, another capacitor plate 44, which is connected to a p-type region at 45 and which overlies an n-type region, has a beige appearance over the majority of its surface area. If this component were satisfactorily formed it would have a substantially uniform brown appearance which would be appreciably darker than the color illustrated. The plate 42 is short circuited to the n-type substrate through an opening in the oxide layer 20 under a silvery area 46. The light color of the entire conductor results from the neutralizing effect of its connection to the n-type substrate. The local silvery region adjacent 46 and the beige color of the entire conductor indicates a short circuit to the n-type substrate.

Referring to FIGURES 8 and 13, a conductor 48 which is predominantly brown after treatment, retains its silvery appearance in a small area at one end. Conductor 48 connects a p-type region 50 to an n-type region 52. The silvery appearance of one end of the conductor indicates the existence of a micro-crack 54. A satisfactory connection would have a uniform coloration throughout its entire length. A light brown coloration would indicate a satisfactory connection if region 50 has a lower resistivity than region 52. If the region 52 of n-type material has a lower resistivity than the region 50 a silvery appearance will be presented. The micro-crack 54 appears because of the repulsion of negative ions from n-type region 52 and produces the silvery appearance in a portion of the conductor 48.

Referring to FIGURES 8 and 14, a conductor 56 connects two p-type regions 58 and 62. It is beige after treatment except in the area adjacent region 62, which is silvery. A satisfactory interconnection would have a uniform appearance, darker than the beige region shown. The appearance of this conductor indicates that it is poorly alloyed to region 58 and that it is over-alloyed to region 62 to an extent that the aluminum-silicon alloy region formed does not react with the negative ions of the solution.

Referring to FIGURES 8 and 16, the brown color of conductor 72 which connects a high resistivity n-type region 74 and a lower resistivity p-type region 76 indicates a satisfactorily formed component.

Referring to FIGURES 8 and 17 a conductor 78 connected to an n-type region 82 forms the upper plate of a capacitor. Its silvery appearance indicates a satisfactorily formed component.

As can be seen by reference to FIGURES 8 and 18, a conductor 84 connected to an n-type region 86 forms the upper plate of another capacitor. The capacitors formed by conductors 84 and 78 are identical and if both were satisfactorily formed both would appear silvery after my treatment. Conductor 84 is poorly alloyed to region 86 and ions are neither attracted to nor repelled from this conductor, which results in its beige appearance.

It will be appreciated that the foregoing description of the manner in which I ascertain the defects in integrated circuits which have been treated in accordance with my invention is merely exemplary. Skilled inspectors practicing my invention will readily detect and interpret even slight abnormalities in the color of the conductors. Moreover, as will also be apparent to those skilled in the art, various modifications of my new process can be made. For example, other solutions or solutions in which positive ions react or in which both positive and negative ions react can be used. Another alternative is to initially coat some or all of the metallic portions of the circuit with a suitable reagent. A treating fluid can then be selected that reacts with the reagent coating, thus providing indicative reactions of various types in addition to color indications.

In conclusion and by way of summary, I place the integrated circuit wafer in an ionic fluid which includes positive and negative ions one of which or both of which color the metallic portions of the circuit in a distinctive manner according to the construction to indicate the semiconducting characteristics of the circuit. I remove the circuit from the treating solution, rinse it, and dry it. I then inspect its surface. I may enhance the inspection procedure for a particular treating solution by using for example, infrared light, polarized light, suitable optical lens system or photographic color filters. With a knowledge of the semiconducting characteristics of the various regions of the circuit, or the color of the various regions of a satisfactorily formed circuit, I can readily detect those abnormalities in the coloration which indicate a flaw.

Thus it will be seen that I have accomplished the objects of my invention. I have provided a novel method of treating semiconductors that facilitates their inspection. By my new process I can readily determine the cause of malfunctions in integrated circuits. In the practice of my invention it is unnecessary to energize the circuit or isolate the components thereof in order to examine it. My new method does not electrically affect the integrated circuits. The practice of my invention makes possible the convenient, expeditious and inexpensive examination and analysis of integrated circuits.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A method of inspecting a semiconductor circuit having aluminum intercircuit component conductors including the step of subjecting the semiconductor circuit to the action of ionized chromic acid in the presence of minor amounts of an alkaline dichromate and ammonium fluoride and a lesser amount of an acid-stable, water-soluble wetting agent in the absence of an external potential.

2. A method of inspecting a semiconductor circuit having aluminum intercircuit component conductors including the step of subjecting the semiconductor circuit to the action of ionized chromic acid in the presence of minor amounts of an alkaline dichromate and ammonium fluoride in the absence of an external potential.

3. A method of inspecting a semiconductor circuit having aluminum intercircuit component conductors including the step of subjecting the semiconductor circuit to the action of ionized chromic acid in the presence of a minor amount of an alkaline dichromate in the absence of an external potential.

4. A method of inspecting a semiconductor circuit having aluminum intercircuit component conductors including the step of subjecting the semiconductor circuit to the action of ionized chromic acid in the presence of a minor amount of ammonium fluoride in the absence of an external potential.

5. A method of inspecting a semiconductor circuit having aluminum intercircuit component conductors including the step of subjecting the semiconductor circuit to the action of ionized chromic acid in the absence of an external potential.

6. A method of inspecting an integrated circuit having a silicon substrate of one conductivity type and aluminum regions formed thereon comprising the steps of treating the circuit in the absence of an external potential with an ionized solution of a compound having an ion capable of reacting with aluminum associated with regions of said one conductivity type imparting a distinctive hue thereto, and inspecting said circuit to detect abnormalities in the hue of said aluminum regions.

7. A method of inspecting an integrated circuit having a silicon substrate of one conductivity type and aluminum regions formed thereon comprising the steps of treating the circuit in the absence of an external potential with an ionized solution of a compound having an ion capable of reacting with aluminum associated with regions of said one conductivity type, and inspecting said circuit to detect abnormalities in the appearance of the aluminum regions.

8. A method of inspecting a semiconductor device comprising a region of material of one conductivity type which includes the steps of treating the device in the absence of an external potential with an ionized solution of a compound having an ion capable of coloring a conductor associated with said region of one conductivity type, drying said device and inspecting said device to detect abnormalities in the color of said conductor.

9. A method of inspecting a semiconductor device comprising a region of material of one conductivity type which includes the steps of treating the device in the absence of an external potential with an ionized solution of a compound having an ion capable of coloring a conductor associated with said region of one conductivity type, and drying said device.

10. A method of inspecting a semiconductor device having a region of material of one conductivity type which includes the step of treating the device in the absence of an external potential with a solution of a compound having an ion capable of coloring a conductor associated with said region of one conductivity type.

11. A method of inspecting a semiconductor device having a region of material of one conductivity type which includes the step of subjecting the device in the absence of an external potential to the action of a solution of an ionized compound having an ion capable of reacting with a conductor associated with said region of one conductivity type to produce a distinctive coating thereon.

12. A method of inspecting a semiconductor device having a region of material of one conductivity type which includes the step of subjecting the device in the absence of an external potential to the action of ionized compounds having ions capable of reacting with a conductor associated with said region of one conductivity type.

13. A method of inspecting a semiconductor device having a region of material of one conductivity type which includes the step of subjecting the device in the absence of an external potential to the action of an ionized compound having an ion capable of reacting with a conductor in contact with said region of one conductivity type.

14. A method of inspecting a semiconductor device having a region of material of one conductivity type which includes the step of subjecting the device in the absence of an external potential to the action of an ionized compound having an ion capable of reacting with a conductor associated with said region of one conductivity type.

15. A solution for treating semiconductor circuits prior to visually inspecting them including in combination a major amount of water, less than about 1.50% by weight of chromic acid and a lesser amount of ammonium fluoride.

16. A solution as in claim 15 in which said solution includes a minor amount of an alkaline dichromate.

17. A solution as in claim 16 including a small amount of an acid-stable, water-soluble wetting agent.

18. An aqueous solution for treating semiconductor circuits prior to visually inspecting them including between slightly less than 0.75% by weight and slightly greater than 1.00% by weight of chromic acid and between slightly less than 0.20% by weight and slightly greater than 0.30% by weight of an alkaline dichromate.

19. An aqueous solution as in claim 18 including about 0.25% by weight of an alkaline dichromate.

References Cited

UNITED STATES PATENTS

| | | | |
|---|---|---|---|
| 2,920,203 | 1/1960 | Switzer et al. | 252—408 XR |
| 3,164,494 | 1/1965 | English | 29—197 |

OTHER REFERENCES

Diamond Alkali Company, "Chromic Acid in the Metal Finishing Industry," (1951), pp. 12–15.

MORRIS O. WOLK, Primary Examiner

R. E. SERWIN, Assistant Examiner

U.S. Cl. X.R.

252—408